Sept. 27, 1949. G. SWAIN 2,483,074
TRAILER HITCH AND BRAKE-ACTUATING MEANS
Filed Nov. 7, 1945 5 Sheets-Sheet 3
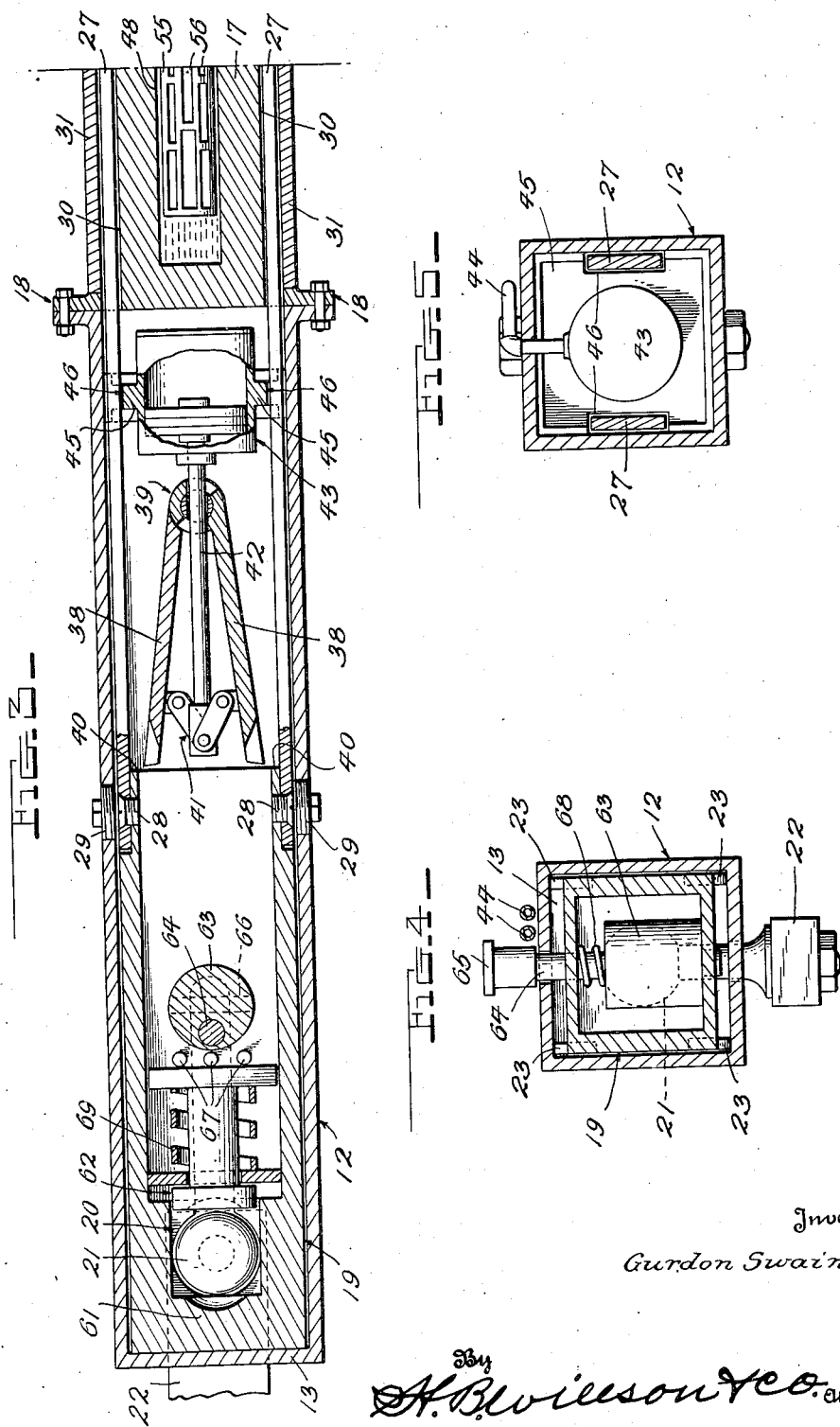
Inventor
Gurdon Swain
By H. B. Wilson & Co. Attorney

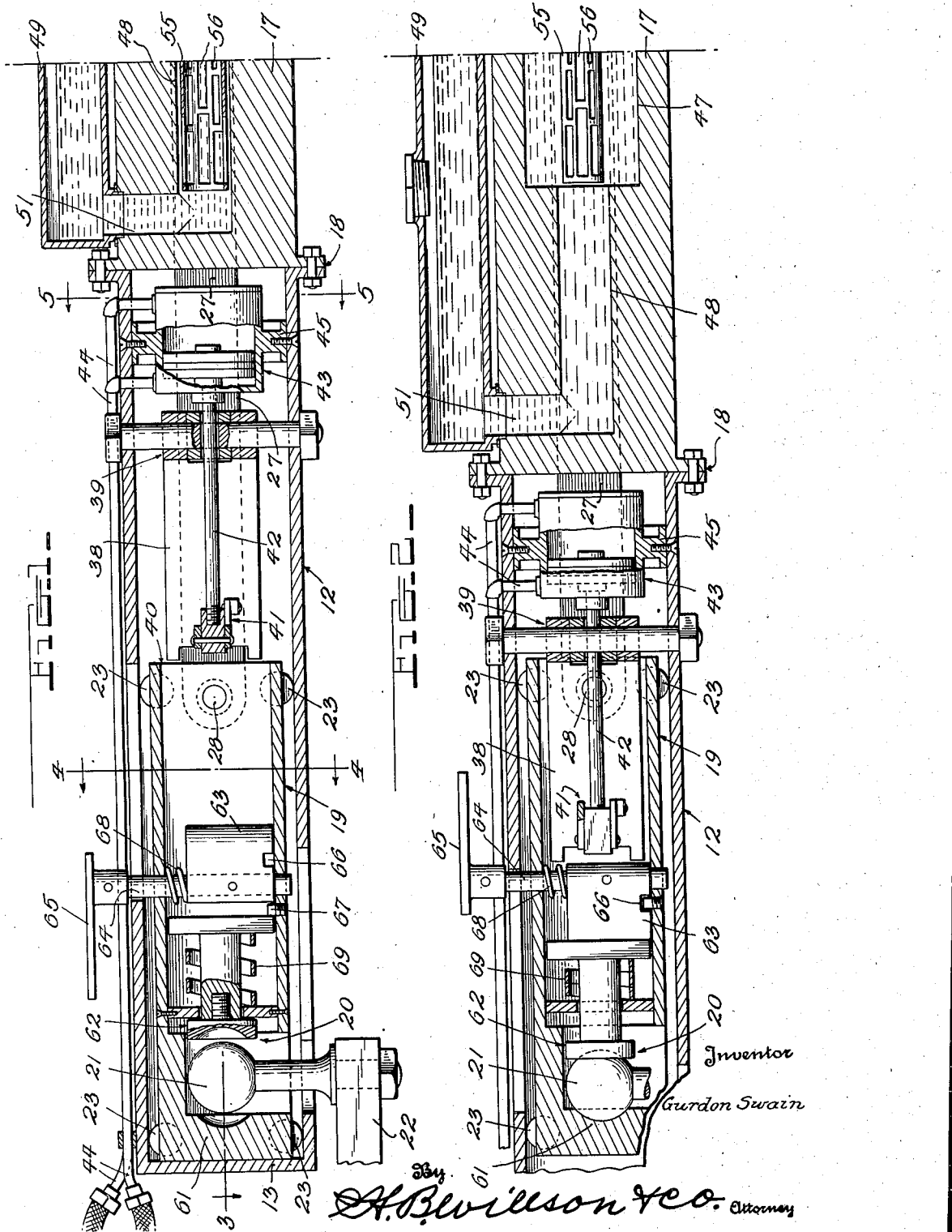

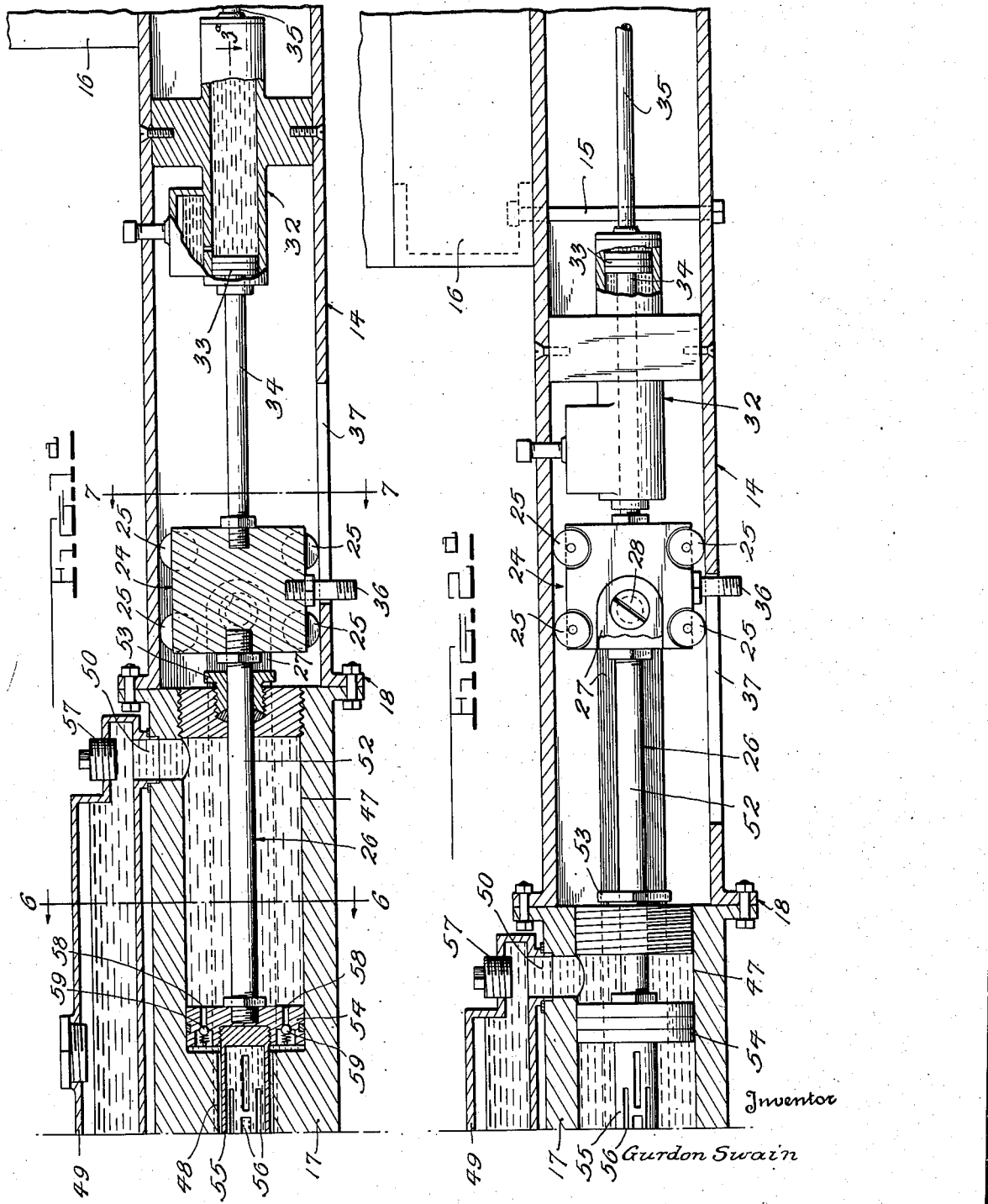

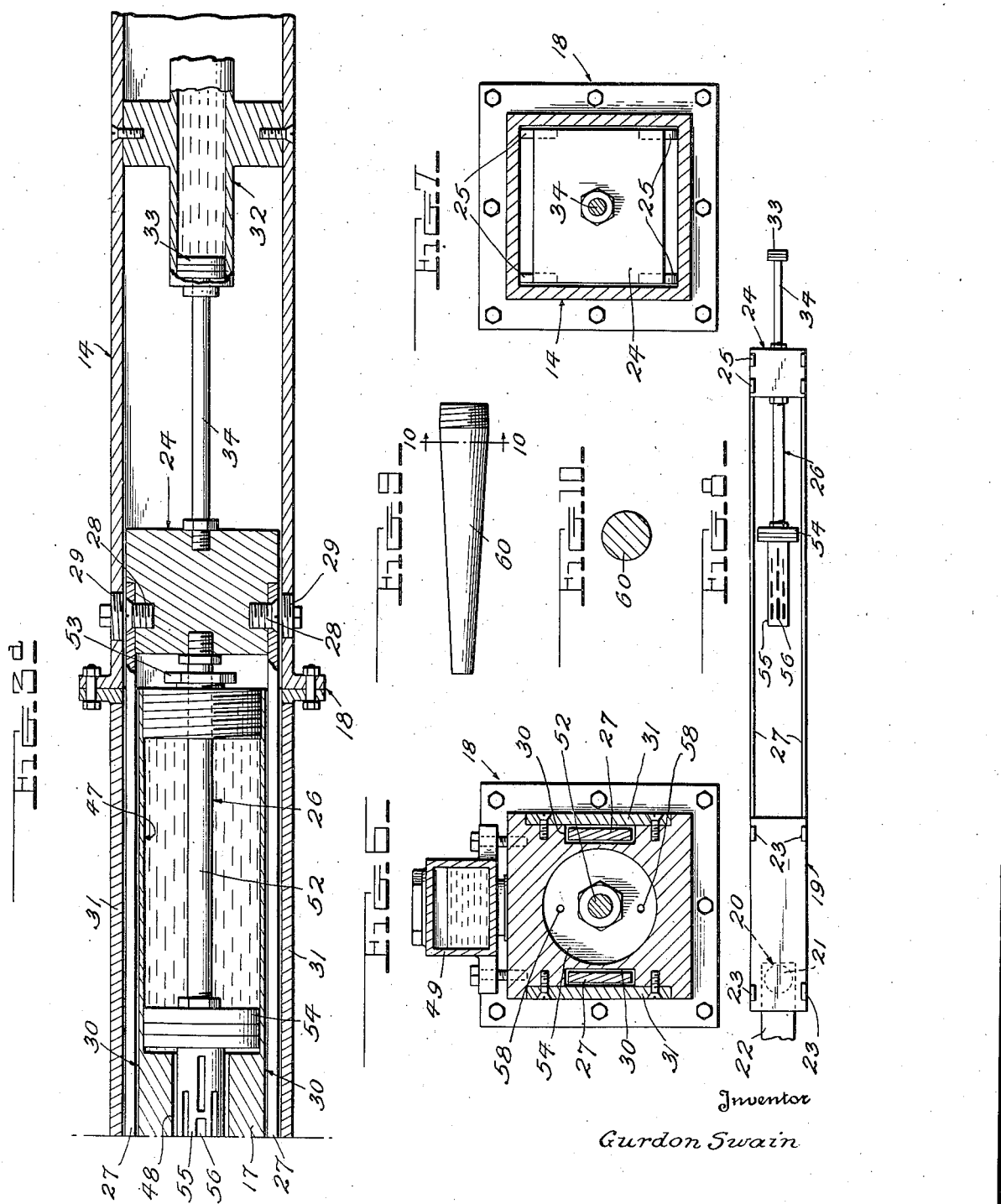

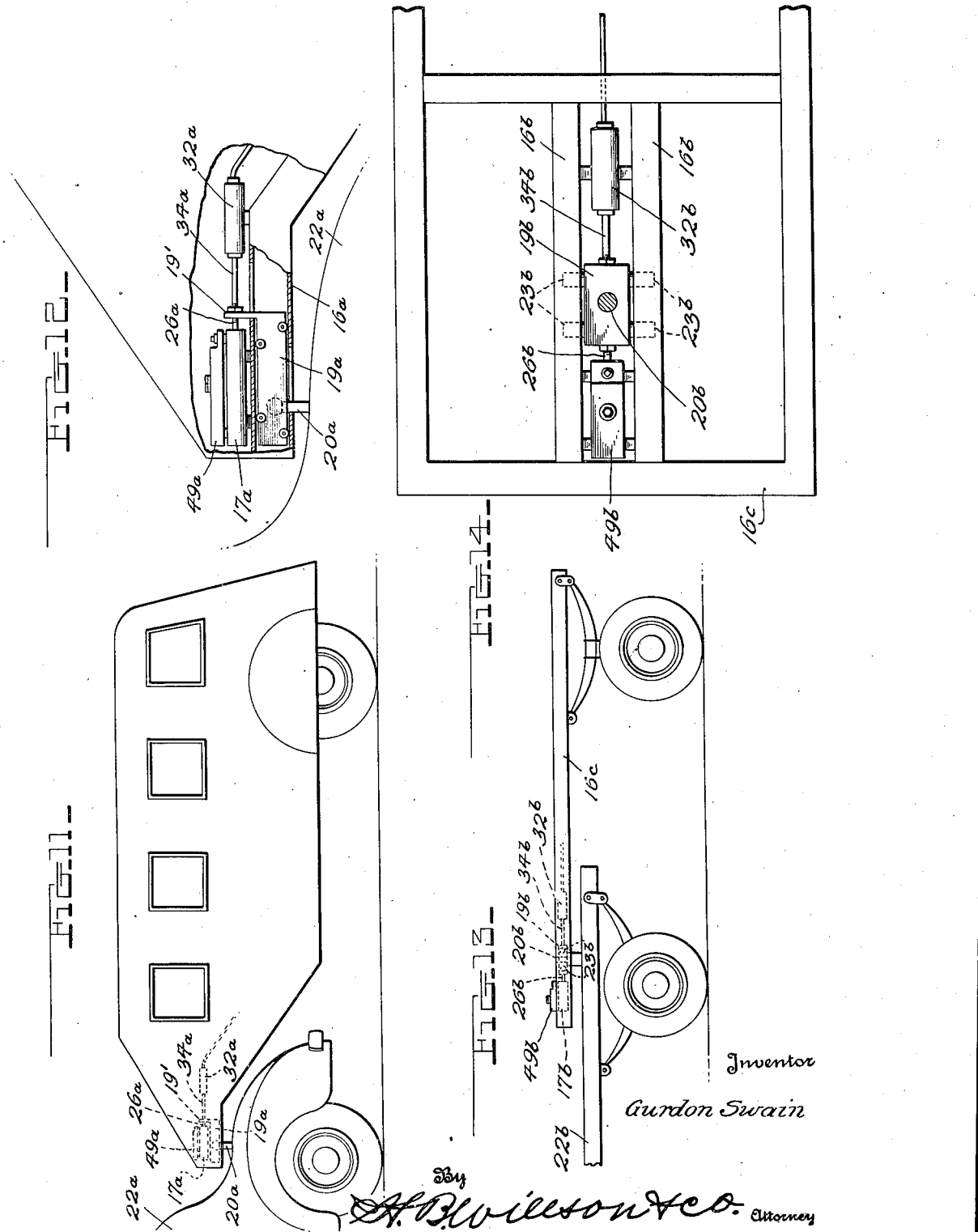

Patented Sept. 27, 1949

2,483,074

UNITED STATES PATENT OFFICE 2,483,074

TRAILER HITCH AND BRAKE-ACTUATING MEANS

Gurdon Swain, Houston, Tex.

Application November 7, 1945, Serial No. 627,112

11 Claims. (Cl. 188—112)

1

The invention relates to hitches and brake-actuators for trailers of various types, in which forward movement of the trailer with respect to a passenger automobile, truck, tractor, or other towing vehicle, when the latter is reduced in speed, causes application of the trailer brakes.

One object of the invention is to provide a reliable mechanism of the type set forth in which there can be no sudden jerking of the relatively slidable parts connected with the towing vehicle and the trailer respectively, such jerking being prohibited by the effective association of shock-absorbing means (preferably hydraulic) with said relatively slidable members.

Another object of the invention is to provide a construction which is equally applicable for applying hydraulic brakes or mechanical brakes.

A further object of the invention is the provision of a novel construction in which all movable parts are confined within adequate housing means to protect them against road or other hazards.

Yet another object is to provide a novel relation of elements which while including all necessary mechanism, will be compact and free from portions projecting objectionably.

Still further objects are to provide unique chocking means to prevent relative sliding of the parts connected with the towing vehicle and trailer respectively, when said towing vehicle and trailer are to be backed, thus preventing the application of the trailer brakes during such backing, and to provide a quickly and easily applicable and releasable means for coupling the invention to the towing vehicle and locking them against accidental release.

With the foregoing and minor objects in view, the invention resides in the novel construction and relation of elements hereinafter described and claimed, and shown in the accompanying drawings.

Figures 1 and 1a jointly disclose a longitudinal sectional view, partly in elevation showing the invention associated with a trailer tongue, the coupling means being released and the various other parts shown in towing position.

Figs. 2 and 2a jointly disclose a longitudinal sectional view showing the coupling means applied and illustrating the relatively movable parts in maximum brake-applying position.

Figs. 3 and 3a jointly disclose a horizontal sectional view as indicated by the line 3—3a of Figs. 1 and 1a.

Figs. 4 and 5 are transverse sectional views on lines 4—4 and 5—5 of Fig. 1.

2

Figs. 6 and 7 are transverse sectional views on lines 6—6 and 7—7 of Fig. 1a.

Fig. 8 is a top plan view showing the forwardly and rearwardly movable unit which is slidable within the trailer tongue and is connected at its front end with the towing vehicle.

Fig. 9 is a side elevation showing a form of plunger for the shock-absorbing means, different from the plunger shown in preceding views.

Fig. 10 is a detail section on line 10—10 of Fig. 9.

Fig. 11 is a side elevation showing a second form of the invention used for connecting a house trailer to a towing vehicle.

Fig. 12 is an enlarged fragmentary elevation partly broken away and in section, showing the construction illustrated in dotted lines in Fig. 11.

Fig. 13 is a side elevation showing another form of the invention used for connecting a trailer with a truck.

Fig. 14 is a top view of a portion of the trailer frame shown in Fig. 13.

The construction disclosed in Figs. 1 to 10 of the drawings will first be explained, and while that construction will be specifically described, attention is invited to the possibility of making variations within the scope of the invention as claimed.

A trailer tongue is disclosed comprising a hollow front section 12 having a closed front end 13, a rear hollow section 14 bolted or otherwise secured at 15 to the trailer frame 16, and a shock-absorbing cylinder 17 interposed between said sections 12 and 14 and rigidly secured thereto. Flange and bolt connections 18 may well be employed between these three tongue sections 12, 14 and 17.

A front carriage 19 is slidably mounted in the front tongue section 12 and is provided at its front end with coupling means 20 for connecting it with a ball 21 on a tow bar 22 or other desired portion of a towing vehicle, said carriage 19 preferably having rollers 23 engaging the front tongue section 12.

A rear carriage 24 is slidably mounted in the rear tongue section 14, said carriage 24 having rollers 25 engaging said tongue section 14. This carriage 24 is provided with a forwardly projecting plunger 26, the front portion of which is operable in the shock-absorbing cylinder 17 to prevent any sudden forward or rearward jerks of said carriage with respect to the trailer tongue, thus prohibiting too-sudden application of trailer brakes and insuring that the towing vehicle shall gently and gradually "pick up" the trailer when starting forward.

Two longitudinal reaches 27 connect the front carriage 19 with the rear carriage 24, and a single forwardly and rearwardly movable unit (see Fig. 8) is formed by said carriages and reaches, the front end of this unit being connected with the tow bar or the like 22 of the towing vehicle while the rear end of said unit is associated with brake-actuating means. In the present disclosure, the reaches 27 are connected with the carriages 19 and 24 by means of screws 28, the front and rear hollow sections 12 and 14 of the tongue being provided with access plugs 29 (Figs. 3 and 3a) for said screws. The front and rear portions of the reaches 27 are received in the hollow front and rear tongue sections 12 and 14, and the intermediate tongue section or cylinder 17 has longitudinal guideways 30 formed in its side wall (Figs. 3, 3a and 6) receiving the intermediate portions of said reaches. The outer walls of these guideways 30 may well be formed by detachable plates 31.

A trailer brake master cylinder 32 is suitably mounted in the rear tongue section 14 behind the rear carriage 24, and the piston 33 of this master cylinder is operable by relative forward and rearward movements of said cylinder and carriage 24. In the present disclosure, the piston 33 is carried by a rod 34 secured to and projecting rearwardly from the carriage 24. A fluid line 35 extends from the master cylinder 32 to the usual cylinders which actuate the brake shoes at the wheels of the trailer, and whenever the trailer moves forwardly with respect to the towing vehicle (compare Figs. 1a and 2a), fluid is forced through the line 35 to apply the trailer brakes. As the parts return to normal positions, the brakes are of course released. Sudden jerking of the trailer-carried and towing-car-carried parts in either brake-applying direction or load pick-up direction, is prevented by the shock-absorbing means including the plunger 26 and the cylinder 17, which means will be hereinafter more specifically described.

The rear carriage 24 may be employed as an actuator for mechanical trailer brakes, if desired, and for illustrative purposes, I have illustrated a stud 36 projecting from said carriage through a slot 37 in the rear tongue section 14 (see Figs. 1a and 2a) for connection with suitable brake-operating connections.

While in Figures 1 and 1a the rear carriage is shown as having the shock absorber plunger projecting from it, it is to be noted that the two carriages 19 and 24 are connected by the reaches 27 to move as a unit, and hence it is obvious that the shock absorber plunger may project from either carriage depending upon whether the shock absorber plunger is to be pushed or pulled.

Two forwardly diverging chocks 38 are pivotally mounted at 39 within the front tongue section 12, immediately in advance of the cylinder 17, said chocks normally having the retracted positions shown in Fig. 3, but being outwardly projectible into engagement with chocking shoulders 40 on the rear end of the front carriage 19, when the towing vehicle and trailer are to be backed. With the chocks 38 abutting the shoulders 40, the trailer tongue cannot slide with respect to the unit shown in Fig. 8 and consequently there can be no brake application during backing of the towing vehicle and trailer. The front portions of the chocks 38 are connected with each other by a toggle 41 and this toggle is connected with the piston rod 42 of a cylinder and piston assembly 43 which is mounted in the rear extremity of the front tongue section 12. Suitable fluid-conducting lines 44 are shown connected with the ends of the assembly 43 and extending forwardly to the towing vehicle. This vehicle is, of course, provided with a suitable valve (not shown) for admitting fluid to one end of the assembly 43 and exhausting it from the other end, and vice versa, to thereby move the toggle 41 to either project the chocks 38 to operative position, or to retract said chocks and hold them retracted. The mounting means 45 for the assembly 43 is suitably notched at 46 to prevent interference with the reaches 27.

The shock-absorbing cylinder 17 has a large bore 47 at its rear end (Figs. 1a, 2a and 3a) and a small bore 48 at its front end (Figs. 1 and 1a, Fig. 2, and Figs. 3 and 3a). A fluid-conducting passage connects the rear end of the large bore 47 with the front end of the small bore 48 and is here shown as consisting of a tank 49 suitably mounted upon the cylinder 17, one port 50 connecting the rear end of this tank with the rear end of the bore 47, and another port 51 connecting the front end of said tank with the front end of the small bore 48. The bores 47 and 48 are cooperable with portions of the plunger 26, as will now be described.

The plunger 26 includes a rod 52 secured to the rear carriage 24 and extending into the rear bore 47 of the cylinder 17, through a stuffing box 53. Secured to the front end of this rod 52 is a piston 54 which is operable in the large bore 47. Projecting forwardly from the piston 54 is a tubular plunger 55 (Figs. 1, 1a, 2, 2a, 3 and 3a). The plunger 55 is tubular, is open at its front end, is loosely slidable in the small bore 48, and is provided with longitudinal fluid-conducting slots 56, said slots decreasing in size and/or number from the front toward the rear of said plunger 45. This construction gradually checks the forward movement of the piston 54 in the large bore 47 by gradually diminishing the ease with which the fluid in advance of said piston may escape and thus there will be no shock when the towing vehicle "picks up" the load of the trailer. It will be noted upon reference to Fig. 3a that the slot 56 nearest the piston 54 terminates short of said piston, so that the plunger 55 has a solid or unslotted portion which enters the bore 48 at the end of the stroke. That construction effectively prevents any jerk or jar when the tow-car starts to pull. Further control of the piston movement may be had by means of an adjustable plug 57 threaded in the rear end of the tank 49 over the port 50, which plug may be adjusted to throttle the flow of fluid from the rear end of the large bore 47 as the piston 54 moves rearwardly, preventing the brakes from "grabbing." I also provide ports 58 through the piston 54, said ports having check valves 59 which open forwardly. These valves close upon forward movement of the piston but open upon rearward movement of the latter, permitting this rearward movement to occur quickly even though the ports 56 may be entirely closed, which would otherwise result in a partial vacuum in front of said piston, with consequent slow starting thereof.

In Figs. 9 and 10, a plunger 60 is shown in the form of a forwardly tapered pin. This plunger may be substituted for the plunger 55, if desired.

The coupling means 20 for connecting the front carriage 19 with the ball 21 includes complemental, relatively fixed and movable members 61 and 62 in the front end of said carriage 19, said members being cooperable with each other in forming a socket for said ball 21. An eccentric 63 is provided to forwardly push the member 62 toward the member 61, said eccentric being suitably secured to a vertical shaft 64 which is mounted in openings of the carriage 19 for rotation and axial shifting, the upper end of said shaft 64 being provided with a suitable handle 65. The lower end of the eccentric 63 is formed with a groove 66 to receive studs 67 projecting upwardly from the bottom of the carriage 19, when the eccentric is in the operative position shown in Fig. 2, thereby locking said eccentric and consequently holding the coupling means engaged with the ball 21. A spring 68 exerts a constant downward pressure on the eccentric 63 to hold it in locking engagement with the studs 67, and the only way this eccentric can be released is by pulling upwardly upon the handle 65, whereupon said eccentric may be turned to permit movement of the member 62 to released position. A spring 69 is provided to effect this latter movement of the member 62, and when the eccentric is released (Figs. 1 and 3), the studs 67 limit the rearward movement of the member 62 under the influence of said spring 69.

Concerning operation of the mechanism, the pull of the towing vehicle is transmitted to the front section 12 of the trailer tongue by the front carriage 19 which normally abuts the end wall 13 of said tongue as seen in Fig. 1. When the brakes are applied to the towing vehicle or its speed is otherwise checked, the trailer and its tongue move forwardly with respect to the unit shown in Fig. 8, said unit comprising the front carriage 19, the reaches 27, the rear carriage 24, the plunger 26, the rod 34 and the brake-applying piston 33. Movable forwardly with the tongue, are the master cylinder 32, the cylinder 17, the chocks 38, and the cylinder assembly 43 connected with said chocks. The forward sliding of the tongue and elements carried thereby with respect to the unit of Fig. 8, is cushioned by the coaction of the cylinder 17 with the front portion of the plunger 26 connected with the rear carriage 24, and said cushioned forward movement causes expulsion of fluid from the master cylinder 32 to apply the trailer brakes without any sudden jerk (or to operate mechanical linkage for the same purpose). When the towing vehicle again starts to pull the load, the necessary relative sliding of the parts is again cushioned by the shock-absorbing means so that the load will not be picked up with a jerk. Whenever it is necessary to back the towing vehicle and the trailer, operation of the cylinder and piston assembly 43 is effected, to project the chocks 38 into cooperative relation with the chocking shoulders 40, thus prohibiting such relative movement of the parts as to apply the brakes.

In Figs. 11 and 12, a carriage 19a overlies the rear portion of a towing vehicle 22a and is connected at 20a with said towing vehicle 22a, said carriage being mounted for forward and rearward sliding in the front portion of a house trailer frame 16a. Carriage 19a has a lug 19' connected to a plunger 26a corresponding to the plunger 26 above described, said plunger 26a extending into a shock-absorbing cylinder 17a secured to the frame 16a over the carriage 19a and corresponding to the above described cylinder 17. The cylinder 17a, the plunger 26a and the tank 49a on said cylinder, are constructed like the elements 17, 26 and 49, above described, and cooperate in the same way. The carriage 19a operates a rod 34a connected with lug 19' to actuate the piston of the trailer brake master cylinder 32a, or mechanical brake-applying means may be connected to said carriage, if desired.

In Figs. 13 and 14, a carriage 19b is guided for forward and rearward sliding by rollers 23b, and two tracks 16b included in the front end of the trailer frame 16c, said carriage 19b being connected with a subjacent part of the towing vehicle 22b by a king pin or the like 20b. The carriage 19b operates a plunger 26b and a rod 34b both directly connected with said carriage. Plunger 26b coacts with a shock-absorbing unit 17b, 49b, like the corresponding units above described, and rod 34b actuates the piston of the trailer brake master cylinder 32b. Instead of using rod 34b and cylinder 32b, mechanical brake-actuating means could, of course, be connected with the carriage 19b.

From the foregoing, taken in connection with the accompanying drawings, it will be seen that novel and advantageous provision has been made for attaining the desired ends, and while preferences have been disclosed, attention is again invited to the possibility of making variations within the scope of the invention as claimed.

I claim:

1. A trailer hitch and brake actuator comprising a hollow trailer tongue having a longitudinal slot in its front portion, a forwardly and rearwardly movable member extending longitudinally within said hollow tongue and having supporting and guiding rollers contacting with the inner side of said tongue, said forwardly and rearwardly movable member having hitch means exposed at said longitudinal slot for connection with a ball on a towing vehicle, a hydraulic brake master cylinder mounted within said hollow tongue behind said forwardly and rearwardly movable member, a master cylinder plunger secured to said forwardly and rearwardly movable member and extending rearwardly into said master cylinder, said plunger and the fluid within said master cylinder constituting means for limiting the rearward movement of said forwardly and rearwardly movable member, hydraulic shock-absorbing means within said hollow tongue for checking the forward movement of said forwardly and rearwardly movable member as it nears its extreme forward position, and a stop carried by said tongue to be struck by said forwardly and rearwardly movable member when it reaches said extreme forward position.

2. A trailer hitch and brake actuator comprising a trailer tongue having a front portion, a rear portion, and a shock-absorbing cylinder between said front and rear portions, a front carriage mounted on said front portion of said tongue, a rear carriage mounted on said rear portion of said tongue, a reach connecting said carriages for forward and rearward movement in unison, said shock-absorbing cylinder having a guide through which the intermediate portion of said reach extends slidably, means for coupling said front carriage to a towing vehicle, trailer brake actuating means connected with said rear carriage, and a shock-absorbing plunger projecting longitudinally from one of said carriages into said shock-absorbing cylinder.

3. A trailer hitch and brake actuator comprising a trailer tongue having a hollow front portion, a hollow rear portion, and a shock-absorbing cylinder between said hollow front and rear portions, a front carriage mounted in said hollow front portion of said tongue, a rear carriage mounted in said hollow rear portion of said tongue, a reach connecting said carriages for forward and rearward movement in unison, the front and rear portions of said reach being confined in said hollow front and rear portions of said tongue, the side wall of said shock-absorbing cylinder having a longitudinal guideway in which the intermediate portion of said reach is slidable, means for coupling said front carriage to a towing vehicle, trailer brake actuating means connected with said rear carriage, and a shock-absorbing plunger projecting longitudinally from one of said carriages into said shock-absorbing cylinder.

4. In a trailer hitch and brake actuator including a trailer tongue having a hollow portion, a brake-actuating member longitudinally slidable in said hollow portion of said tongue, and means for coupling said member to a towing vehicle; a normally retracted shock mounted in said hollow portion of said tongue for projection into engagement with said member when backing, a cylinder and piston assembly mounted in said hollow portion of said tongue and operatively connected with said chock for projecting and retracting the latter, and means for conducting fluid to and from said assembly to operate said chock.

5. In a trailer hitch and actuator, relatively slidable members for connection with a trailer and a towing vehicle respectively, one of said members having two laterally spaced chocking shoulders, two diverging chocks pivotally mounted on the other of said members for outward swinging into engagement with said chocking shoulders when the towing vehicle and trailer are to be backed, a toggle connecting said chocks for projecting and retracting them, and operating means connected with said toggle.

6. In a trailer hitch and brake actuator, a trailer including a longitudinal shock-absorbing cylinder having a large bore at its rear end and a small bore at its front end, said rear end having a stuffing box, a forwardly and rearwardly movable brake actuator mounted on the trailer, means for connecting said brake actuator with a towing vehicle, a piston rod connected with said brake actuator and extending forwardly through said stuffing box, a piston on said rod operable within said large bore, a plunger projecting forwardly from said piston and operable within said small bore, said plunger being constructed to gradually diminish the flow of fluid from said large bore into said small bore as the piston and plunger move forwardly, and a fluid passage connecting the front end of said small bore with the rear end of said large bore.

7. In a trailer hitch and brake actuator, a trailer including a longitudinal shock-absorbing cylinder having a large bore at its rear end and a small bore at its front end, said rear end having a stuffing box, a forwardly and rearwardly movable brake actuator mounted on the trailer, means for connecting said brake actuator with a towing vehicle, a piston rod connected with said brake actuator and extending forwardly through said stuffing box, a piston on said rod operable within said large bore, a plunger projecting forwardly from said piston and operable within said small bore, said plunger being tubular, open at its front end and longitudinally slotted from its interior to its exterior to gradually diminish the flow of fluid from said large bore into said small bore as the piston and plunger move forwardly, and a fluid passage connecting the front end of said small bore with the rear end of said large bore.

8. In a trailer hitch and brake actuator, a trailer including a longitudinal shock-absorbing cylinder having a large bore at its rear end and a small bore at its front end, said rear end having a stuffing box, a forwardly and rearwardly movable brake actuator mounted on the trailer, means for connecting said brake actuator with a towing vehicle, a piston rod connected with said brake actuator and extending forwardly through said stuffing box, a piston on said rod operable within said large bore, a plunger projecting forwardly from said piston and operable within said small bore, said plunger being forwardly tapered to gradually diminish the flow of fluid from said large bore into said small bore as the piston and plunger move forwardly, and a fluid passage connecting the front end of said small bore with the rear end of said large bore.

9. A structure as specified in claim 6; together with adjustable means for throttling the flow of fluid into said large bore to a required extent to control the rearward movement of said piston, and a passage through said piston having a forwardly opening check valve to permit the piston to quickly move rearwardly when admission of fluid to the front end of said large bore is momentarily prevented by said plunger.

10. A trailer hitch and brake actuator comprising a forwardly and rearwardly movable carriage mounted on the front end of a trailer and adapted to overlie a portion of a towing vehicle, a shock-absorbing cylinder fixedly mounted on the trailer over said carriage, a shock-absorbing plunger connected with said carriage and operable in said cylinder, means for connecting said carriage with the subjacent portion of the trailer, and trailer brake-actuating means operated by said carriage.

11. A trailer hitch and brake actuator comprising a carriage to overlie a portion of a towing vehicle, longitudinal trackage on the trailer mounting said carriage for forward and rearward sliding, means for connecting said carriage with the subjacent portion of the towing vehicle, a brake master cylinder mounted on the trailer behind said carriage, a shock-absorbing cylinder mounted on the trailer in front of said carriage, a brake-actuating rod extending rearwardly from said carriage into said master cylinder, and a shock-absorbing plunger extending forwardly from said carriage into said shock-absorbing cylinder.

GURDON SWAIN.

REFERENCES CITED

The following references are of record in the file of this patent:

UNITED STATES PATENTS

| Number | Name | Date |
|---|---|---|
| 1,896,427 | Selvester | Feb. 7, 1933 |
| 2,051,522 | Graham | Aug. 18, 1936 |
| 2,138,267 | Christenson | Nov. 29, 1938 |
| 2,401,084 | Laudahl | May 28, 1946 |